(12) United States Patent
Vasavada

(10) Patent No.: US 7,155,632 B2
(45) Date of Patent: Dec. 26, 2006

(54) METHOD AND SYSTEM FOR IMPLEMENTING IS-IS PROTOCOL REDUNDANCY

(75) Inventor: Nishit Vasavada, Fremont, CA (US)

(73) Assignee: Nokia, Inc., Irving, TX (US)

( * ) Notice: Subject to any disclaimer, the term of this patent is extended or adjusted under 35 U.S.C. 154(b) by 612 days.

(21) Appl. No.: 10/183,272

(22) Filed: Jun. 27, 2002

(65) Prior Publication Data

US 2004/0078619 A1    Apr. 22, 2004

(51) Int. Cl.
*G06F 11/00* (2006.01)
(52) U.S. Cl. .............................. 714/4; 714/13; 370/216
(58) Field of Classification Search .................... 714/4, 714/13; 370/216
See application file for complete search history.

(56) References Cited

U.S. PATENT DOCUMENTS

| | | | |
|---|---|---|---|
| 5,539,881 A | 7/1996 | Hunt et al. | |
| 5,964,841 A | 10/1999 | Rekhter | |
| 6,097,718 A | 8/2000 | Bion | |
| 6,097,728 A | 8/2000 | Sharma et al. | |
| 6,201,810 B1 | 3/2001 | Masuda et al. | |
| 6,253,327 B1 | 6/2001 | Zhang et al. | |
| 6,278,687 B1 | 8/2001 | Hunneyball | |
| 6,628,649 B1* | 9/2003 | Raj et al. | 370/360 |
| 2002/0060986 A1* | 5/2002 | Fukushima et al. | 370/218 |
| 2003/0084371 A1* | 5/2003 | Mongazon-Cazavet et al. | 714/13 |
| 2003/0218982 A1* | 11/2003 | Folkes et al. | 370/238 |
| 2004/0042395 A1* | 3/2004 | Lu et al. | 370/225 |
| 2004/0258065 A1* | 12/2004 | Akyol et al. | 370/389 |
| 2005/0078600 A1* | 4/2005 | Rusmisel et al. | 370/217 |

FOREIGN PATENT DOCUMENTS

WO    WO 02 01413 A    1/2002

OTHER PUBLICATIONS

Microsoft Press Computer Dictionary, 1997, Microsoft Press, Third Edition, p. 101.*
McPherson, D.: "Bolstering IP routers for High Availability," CommsDesign, Apr. 2, 2001, URL:www.commsdesign.com.
"Cisco High Availability Initiatives," Cisco, Feb. 7, 2002, URL:www.cisco.com.
"Cisco's Flagship Switching Platform Scales to Enhance E-commerce Networks," Cisco, Sep. 19, 2000, URL:www.cisco.com.
Agilent Technologies: "Demystifying and Evaluation Router Resiliency," White Paper, Nov. 22, 2002, URL:www.http://advanced.comms.agilent.com/routertester/member/appnotes/pdf/routerres.pdf.

* cited by examiner

*Primary Examiner*—Robert Beausoliel
*Assistant Examiner*—Marc Duncan
(74) *Attorney, Agent, or Firm*—Squire, Sanders & Dempsey L.L.P.

(57) ABSTRACT

The present invention relates to a method and system for implementing link level protocol redundancy in a router. In particular, the invention relates to providing redundancy of the Intermediate System Intra-domain Routing Information Exchange Protocol (IS-IS) routing protocol. An active processor provides IS-IS operations. In the present invention, a standby processor is coupled to the active processor. During the initial synchronization, all protocol information from the active processor is forwarded to the standby processor. The protocol information can include IS-IS global protocol information, IS-IS configuration information, IS-IS adjacencies information, IS-IS interface information and link state packet information. Thereafter, any updates of protocol information are immediately forwarded to the standby processor in an orderly and controlled manner. Upon failure of the active processor, the router is switched to the standby processor and all IS-IS protocol operations are performed on what used to be the standby processor.

29 Claims, 5 Drawing Sheets

METHOD AND SYSTEM FOR IMPLEMENTING IS-IS PROTOCOL REDUNDANCY

BACKGROUND OF THE INVENTION

1. Field of the Invention

This invention relates to network communications and more particularly to redundancy of the routing protocol Intermediate System to Intermediate System Intra-domain Routing Information Exchange ("IS-IS") and apparatus for protecting protocol services of a router and neighbor routers from failure within the router.

2. Related Art

Data packets progress through data networks by being sent from one machine to another towards their destination. Routers or other types of switches are used to route the data packets over one or more links between a data source, such as a customer's computer connected to the data network, and a destination. Routing protocols such as Intermediate System to Intermediate System Intra-domain Routing Information Exchange Protocol ("IS-IS"), Border Gateway Protocols ("BGP"), Routing Information Protocol ("RIP"), and Open Shortest Path First Protocol ("OSPF") enable each machine to understand which other machine is the "next hop" that a packet should take towards its destination. Routers use the routing protocols to construct routing tables. Thereafter, when a router receives a data packet and has to make a forwarding decision, the router "looks up" the next hop machine in the routing table. Conventionally, the routers look up the routing table using the destination IP address in the data packet as an index.

IS-IS is a link state protocol which stores information about the state of links and uses that data to select paths. IS-IS is defined by the International Standard Organization as described in ANS1 X353.3/87-150R, 1987 and RFC-1074, which references are incorporated by references into this application. IS-IS specifies two level hierarchical routing in which Level 1 routing deals with routing within an area and Level 2 routing deals with routing between different areas. Each node maintains a complete topology of the whole network. Route computation is based on a modified version of Dijkstra's Shortest Path First (SPF) algorithm. A process referred to as configuration defines how routers learn about each other.

When conventional IP edge routers lose their primary circuitry and operation falls back to a redundant controller, a five to fifteen minute outage ensues while the router relearns the routing states and packet forwarding tables. In order to enhance the reliability of the router device, it is important to multiplex the above-mentioned route calculation units. The multiplex router device includes a plurality of route calculation units, and always has one route calculation unit placed in the active mode to make it execute an ordinary process while keeping the remaining route calculation units in a standby mode. When the route calculation unit in the active mode runs into trouble, the multiplex router device brings one of the waiting route calculation units into the active mode (this is referred to as a system switchover of route calculation units), and the one other route calculation unit takes over and continues to execute the process that was previously being executed by the route calculation unit in trouble.

It is desirable to provide high network availability by providing improved redundancy which can be implemented as a link level protocol running over IP having a backup link level process in total real time synchronization with an active one in order to enable an expeditious switchover when a failure occurs on the active control card.

SUMMARY OF THE INVENTION

The present invention relates to a method and system for implementing link level protocol redundancy in a router. In particular, the invention relates to providing redundancy of the Intermediate System to Intermediate System (IS-IS) Intra-domain Routing Information Exchange Protocol routing protocol. An active processor provides IS-IS operations. In the present invention, a standby processor is coupled to the active processor. During the initial synchronization, all protocol information from the active processor is forwarded to the standby processor. The protocol information can include IS-IS global protocol information, IS-IS configuration information, IS-IS adjacencies information, IS-IS interface information and link state packet information. Thereafter, any updates of protocol information are immediately forwarded to the standby processor in an orderly and controlled manner. Upon failure of the active processor, the Standby controller takes over as the Active controller. All IS-IS protocol operations are performed on the new Active processor. In the present invention, all states of the protocol immediately function as if a failure had not occurred. Neighbor routers will not notice any difference after switchover, and no additional information is needed from neighbor routers after the switch-over. Accordingly, the router's forwarding capability will remain unaffected.

In the present invention the Standby IS-IS processor stays in a highly synchronized state with the Active IS-IS processor, referred to as a hot-standby state. Accordingly, an expeditious switchover to the Standby processor occurs when the Active processor fails.

The invention will be more fully described by reference to the following drawings.

DETAILED DESCRIPTION

Figure 1:
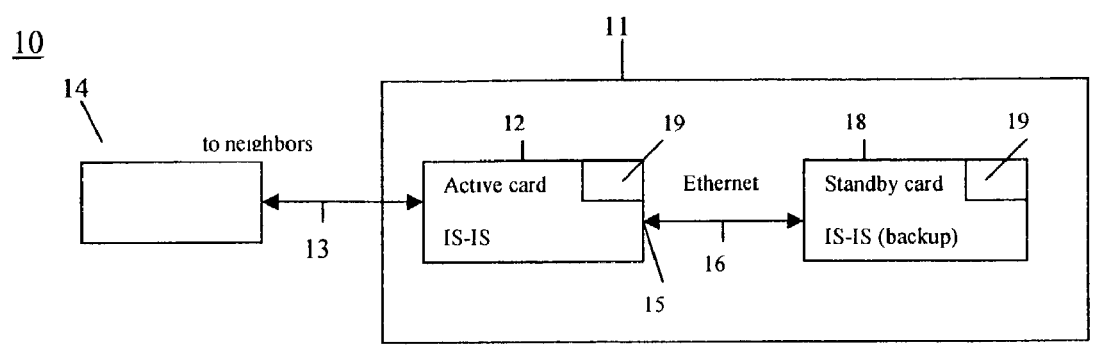
FIG. 1 is a schematic diagram of a system for implementing IS-IS protocol redundancy.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a schematic diagram of a system for implementing IS-IS redundancy in a router 10 in accordance with the teachings of the present invention. Router 11 includes active IS-IS control card 12. Active IS-IS control card 12 performs IS-IS operations. IS-IS operations include mechanisms for building maintaining and verifying one or more adjacencies 13 to one or more neighbor routers 14, exchanging link state packets (LSP) with neighbors, updating best network routes to a local routing table and maintaining related timers. When existence of two neighboring routers is confirmed explicitly bi-directionally, the routers are referred to as adjacent. Adjacencies control distribution of routing protocol packets, which are sent and received only to adjacent routers.

Standby IS-IS control card 18 is removably coupled to router 11. In the absence of standby IS-IS control card 18, active IS-IS control card 12 operates in a non-redundant mode similar to a conventional IS-IS router. Active IS-IS control card 12 communicates protocol information 15 over communication link 16 to standby IS-IS control card 18. Preferably, communication link 16 is a fast and reliable communication channel. For example, communication link 16 can be a duplex Ethernet. The same redundancy software for IS-IS operations 19 runs on both active IS-IS control card 12 and standby IS-IS control card 18. Redundancy software for IS-IS operations 19 controls updating of protocol information 15 between active IS-IS control card 12 and standby IS-IS control card 18 and distinguishes between an active mode and a backup mode using system state information, as described in more detail below.

One embodiment of the present invention utilizes IS-IS protocols running on the Nokia ASR2000 router (or, alternatively, the ASR2020). The Nokia ASR2000 and ASR2020 technical manuals are incorporated herein by reference as if fully set out. Active IS-IS control card 12 and standby IS-IS control card 18 are processors which are coupled to a line card and ASIC driver of router 11.

After standby IS-IS control card 18 is coupled to router 11, an initial synchronization is performed for transferring provisioning data from running active IS-IS control card 12 to standby IS-IS control card 18 using redundancy software for IS-IS operations 19. After the initial synchronization, an IS-IS process running in the redundancy software for IS-IS operations 19 operates in an incremental updating mode. Updates can be posted to active IS-IS control card 12. All updates are forwarded to standby IS-IS control card 18. Standby IS-IS control card 18 receives all LSP messages and updates in order to maintain total real time synchronization between active IS-IS control card 12 and standby IS-IS control card 18. Accordingly, standby IS-IS control card 18 mirrors active IS-IS control card 12 for implementing redundancy. Standby IS-IS control card 18 has complete information about configuration, global state and non-configuration information, current state of each circuit, current state of adjacency with each neighbor and current LSP database, as described in detail below. In this state, referred to as hot-standby, active IS-IS control card 12 and standby IS-IS control card 18 maintain a substantially synchronous state. Thereafter, if a failure of active IS-IS control card 12 occurs, standby IS-IS control card 18 will become active and be capable of immediately taking over all operations which were previously performed by active IS-IS control card 12.

Figure 2:
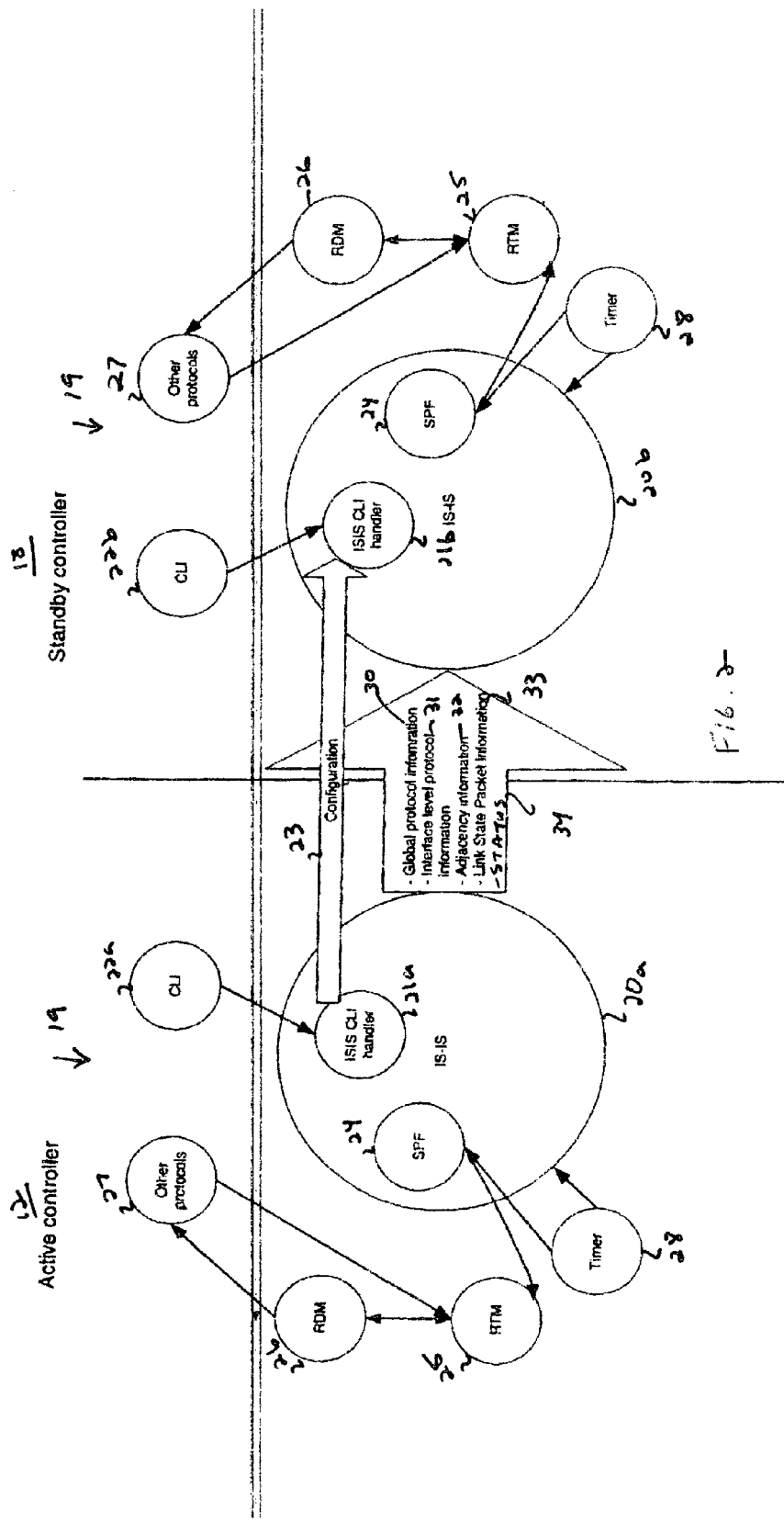
FIG. 2 is a schematic diagram of a redundancy software implementation.

FIG. 2 illustrates a detailed schematic diagram of redundancy software for IS-IS operations 19 of active IS-IS control card 12 and standby IS-IS control card 18. IS-IS task 20a is a task for determining the status of IS-IS processes running on active IS-IS control card 12 and to send protocol information 15 to standby IS-IS control card 18. IS-IS task 20a includes IS-IS command line interface (CLI) handler 21a for receiving commands from command line interface (CLI) 22a. Configuration information 23 from CLI handler 21a is forwarded to CLI handler 21b of IS-IS task 20b at standby IS-IS control card 18. CLI handler 21b processes commands received from 21a as if they were received from local CLI 22b.

IS-IS task 20a, 20b include shortest path first (SPF) module 24 for computing the shortest route to all destinations. The computed shortest routes are stored in route table manager (RTM) 25. RTM 25 communicates with route distribution manager (RDM) 26. RDM 26 distributes routes from RTM 25 to other routing protocols 27. Timer 28 provides timer service to IS-IS tasks 20a, 20b. Timer triggered events of timer 28 can include, for example, sending of a Hello packet, timing of an adjacency receipt of a Hello packet from a neighbor and timing a lifetime of a LSP. Active IS-IS control card 12 and standby IS-IS control card 18 process LSP packets and calculates the shortest path first with SPF module 24 which decides the shortest path from a router to a destination network by considering cost.

Active IS-IS control card 12 can send LSPs to the line card for transmission to neighbor routers. Standby IS-IS control card 18 does not send any LSP packets to the line card for transmission to neighbor routers. Active IS-IS control card 12 and standby IS-IS control card 18 send updates to RTM 25. Timer 28 runs on IS-IS standby control card 18 and does not trigger any timeouts unless the standby IS-IS control card 18 becomes the active card. An active state is associated with active IS-IS control card 12. A standby state is associated with standby IS-IS control card 18. A switchover from active IS-IS control card 12 to standby IS-IS control card 18 will occur upon failure of active IS-IS control card 12. When a switchover occurs, standby IS-IS control card 18 changes its state to active and takes over all IS-IS operations. Standby IS-IS control card 19 resumes any suppressed IS-IS actions and begins sending LSPs to the line card.

During the initial synchronization, IS-IS task 20b on standby IS-IS control card 18 contacts IS-IS task 20a on active IS-IS control card 12 for retrieving task information. IS-IS task 20a on active IS-IS control card 12 automatically processes link state packet (LSP) information, calculates routes, and stores them in RTM 25. Active IS-IS control card 12 marks corresponding internal states and transfers IS-IS global protocol information 30, IS-IS interface information 31, IS-IS adjacencies information 32, link state packet information 33 and status information 34 to standby IS-IS control card 18.

Figure 3:
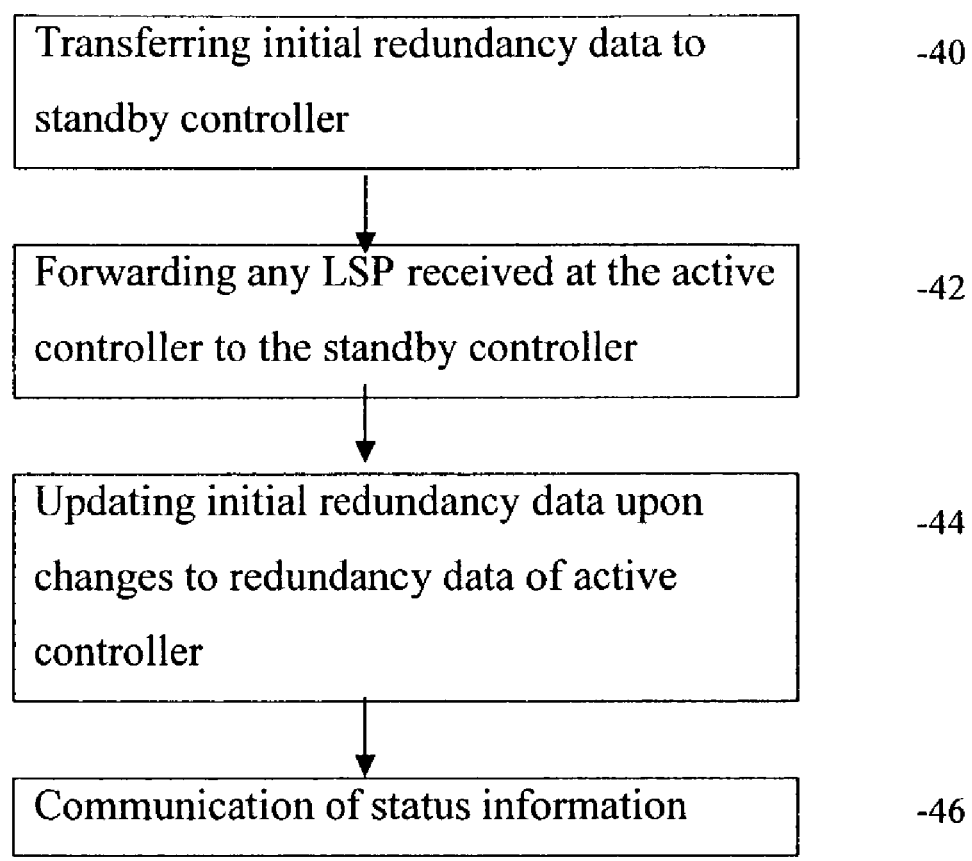
FIG. 3 is a flow diagram of steps for transfer of protocol information from an Active process to a Standby process.
Figure 4:
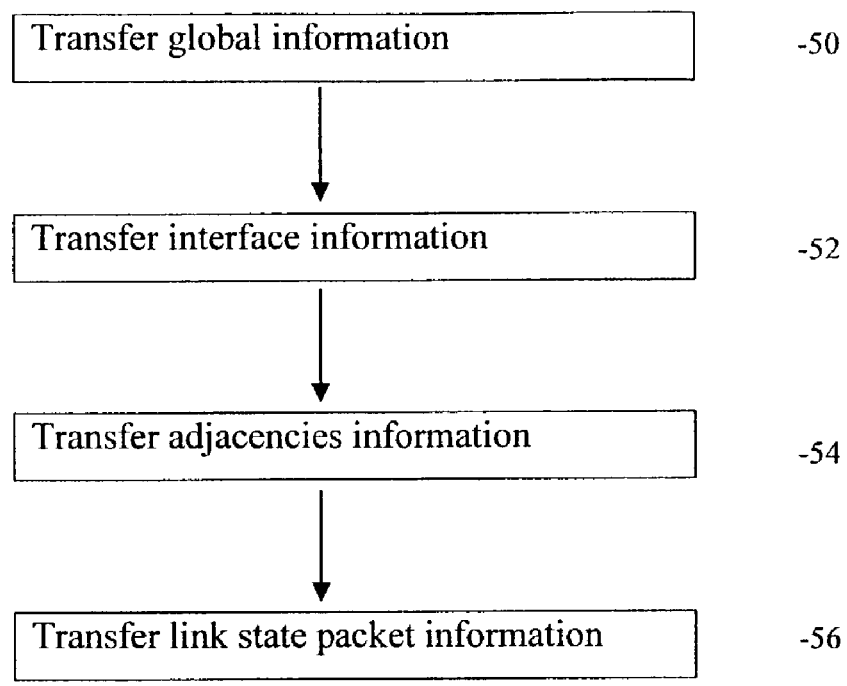
FIG. 4 is a flow diagram of steps for transferring initial redundancy data from the active process to the standby process.

FIG. 3 is a flow diagram of steps for initializing and operating a standby process. In block 40, initial redundancy information data is transferred from an operating active IS-IS control card 12 to standby IS-IS control card 18 which is inserted in router 11 and is coupled to active IS-IS control card 12. Referring to FIG. 4, a flow diagram of an implementation of step 40 is shown for forwarding initial redundancy information data. In block 50, global protocol information 30 is transferred from active IS-IS control card 12 to standby IS-IS control card 18. Global protocol information 30 is independent of configuration of interfaces, neighbors, adjacencies and LSP related information. For example, global information includes timer and state information, such as if the state of router 11 is enabled or disabled. Global protocol information 30 can be communicated from active IS-IS control card 12 to standby control card 18 through communication link 16 using a redundancy application programming interface (API).

In block 52, IS-IS interface level protocol information 31 is transferred for each interface from active IS-IS control card 12 to standby IS-IS control card 18. IS-IS circuits (as the interfaces are conventionally referred to) map one on one to the logical interface of the system, which in turn map one or more multiple on one to the physical interfaces of the system. For example, IS-IS interface level protocol information 31 includes information on configuration of circuits and the state of each of the circuits as either enabled or disabled. IS-IS interface level protocol information 31 can be communicated from active IS-IS control card 12 to standby control card 18 through communication link 16 using the redundancy API.

In block 54, IS-IS adjacencies information 32 is transferred from active IS-IS control card 12 to standby IS-IS control card 18. IS-IS adjacencies information 32 includes information about all adjacencies, which have been established by active IS-IS control card 12 with the neighbors. IS-IS adjacencies information 32 is sent from active IS-IS control card 12 for adjacencies which have been established and are in an up state. IS-IS adjacencies information 32 can be communicated from active IS-IS control card 12 to standby control card 18 through communication link 16 using the redundancy API. For example, IS-IS adjacencies information 32 about one or more adjacencies can be forwarded in a single message with redundancy API.

In block 56, link state packet information 33 is transferred from active IS-IS control card 12 to standby IS-IS control card 18. In block 57, status information is transferred from active IS-IS control card 12 to standby IS-IS control card 18, as described below.

Figure 5:
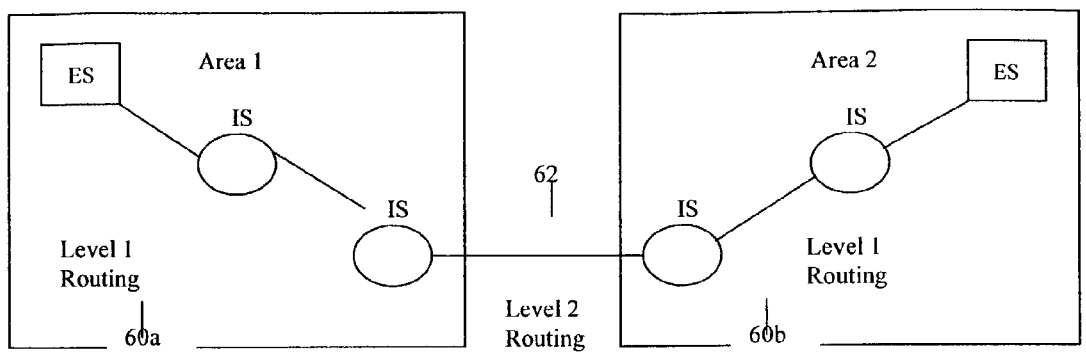
FIG. 5 is a schematic diagram of hierarchical routing in the IS-IS protocol.

Referring to FIG. 3, in block 42 LSP information 33 received at active IS-IS control card 12 are forwarded to standby control card 18. In IS-IS, LSPs are flooded to the entire area, for Level 1 IS, or domain, for Level 2 IS, and are stored in each IS in LSP database. FIG. 5 illustrates a schematic diagram of level 1 routing 60*a* and 60*b* and level 2 routing 62. LSP information can be forwarded from active IS-IS control card 12 to standby IS-IS control card 18 using a redundancy application programming interface (API).

Thereafter, in block 44 initial redundancy data is updated upon updating of changes to initial redundancy in active IS-IS control card 12. Updates of initial redundancy data can include incremental updates of global information, interface information and adjacency information. Updates of adjacency information can include forming of a new adjacency with a neighbor, deleting an established adjacency with a neighbor and refreshing of the expiration timer of an existing adjacency. The adjacency information of a single adjacency is forwarded to standby IS-IS control card 18.

In block 46, status information 34 is communicated from active IS-IS control card 12 to standby IS-IS control card 18. Status information can include status on the start of running of the Shortest Path First (SPF) algorithm in module 24 algorithm in active IS-IS control card 12, timer information of timer 28 for running of the SPF algorithm of active IS-IS control card 12 and ending of running of the SPF algorithm in SPF module 24 of active IS-IS control card 12. For example, if standby IS-IS control card 18 receives information about the start but not about the end of running the SPF algorithm in SPF module 24 before it is switched over to running as an active card, the routes being established by the SPF algorithm were not applied to RTM 25. Additional communication of status information can be determined from timer triggered events of timer 28.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

What is claimed is:

1. A routing protocol redundancy method comprising:
providing a router having an active processor;
coupling a standby processor to said active processor;
forwarding protocol information from said active processor to said standby processor for synchronizing link configuration and link protocol states of said active processor at said standby processor upon coupling of said standby processor to said active processor, wherein the protocol information comprises global protocol information, interface information, adjacencies information, link state packet information, and status information; and
switching said router to said standby processor when a failure is detected at said active processor;
wherein all states of said link protocol immediately function as if the failure had not occurred.

2. The method of claim 1 wherein said link protocol is an intermediate system to intermediate system (IS-IS) protocol.

3. The method of claim 2 wherein said protocol information is configuration information, which is received from Command Line Interface (CLI) commands.

4. The method of claim 1 further comprising:
updating said protocol information at said active processor; and
forwarding said updated protocol information to said standby processor.

5. A routing protocol redundancy method, comprising:
providing a router having an active processor;
coupling a standby processor to said active processor;
forwarding protocol information from said active processor to said standby processor for synchronizing link configuration and link protocol states of said active processor at said standby processor upon coupling of said standby processor to said active processor, wherein the protocol information comprises at least one of global protocol information, interface information, adjacencies information, link state packet information, and status information; and
switching said router to said standby processor when a failure is detected at said active processor;
wherein all states of said link protocol immediately function as if the failure had not occurred,
wherein said link protocol is an intermediate system to intermediate system (IS-IS) protocol, and
wherein said forwarding protocol information includes forwarding IS-IS global protocol information of said active processor.

6. The method of claim 5 wherein global protocol information is forwarded using a redundancy application programming interface (API).

7. The method of claim 5 wherein said forwarding protocol information includes forwarding IS-IS interface level protocol information of said active processor.

8. The method of claim 7 wherein said IS-IS interface level protocol information is forwarded using a redundancy application programming interface (API).

9. The method of claim 7 wherein said forwarding protocol information includes forwarding IS-IS adjacencies information of said active processor.

10. The method of claim 9 wherein said IS-IS adjacencies information is forwarded using a redundancy application programming interface (API).

11. The method of claim 9 wherein said forwarding protocol information includes forwarding link state packet (LSP) information of said active processor.

12. The method of claim 11 wherein said LSP information is forwarded using a redundancy application programming interface (API).

13. The method of claim 11 wherein said forwarding protocol information includes forwarding status information.

14. A routing protocol redundancy method, comprising:
providing a router having an active processor;
coupling a standby processor to said active processor;
forwarding protocol information from said active processor to said standby processor for synchronizing link configuration and link protocol states of said active processor at said standby processor upon coupling of said standby processor to said active processor; and
switching said router to said standby processor when a failure is detected at said active processor;
wherein all states of said link protocol immediately function as if the failure had not occurred,
wherein said link protocol is an intermediate system to intermediate system (IS-IS) protocol,
wherein said forwarding protocol information includes forwarding IS-IS global protocol information of said active processor,
wherein said forwarding protocol information includes forwarding IS-IS interface level protocol information of said active processor,
wherein said forwarding protocol information includes forwarding IS-IS adjacencies information of said active processor,
wherein said forwarding protocol information includes forwarding link state packet (LSP) information of said active processor,
wherein said forwarding protocol information includes forwarding status information,
wherein said status information is selected from the group consisting of status on the start of running a shortest path first (SPF) algorithm at said active processor, status on timer information for said SPF algorithm and status on ending of running of said SPF algorithm.

15. An IS-IS protocol redundancy method comprising:
providing a router having an active processor;
coupling a standby processor to said active processor;
forwarding network IS-IS protocol information from said active processor to said standby processor for synchronizing IS-IS configuration and IS-IS protocol states of said active processor at said standby processor, wherein the protocol information comprises global protocol information, interface information, adjacencies information, link state packet information, and status information; and
switching said router to said standby processor when a failure is detected at said active processor;
wherein all states of said IS-IS protocol immediately function as if the failure had not occurred.

16. A routing protocol redundancy method comprising:
providing a router having an active processor;
coupling a standby processor to said active processor;
forwarding IS-IS protocol information from said active processor to said standby processor for synchronizing link configuration and link protocol states of said active processor at said standby processor, said IS-IS protocol information comprising IS-IS global protocol information, IS-IS interface information, link state packet (LSP) information, IS-IS configuration information and IS-IS adjacencies information; and
switching said router to said standby processor when a failure is detected at said active processor;
wherein all states of said link protocol immediately function as if the failure had not occurred.

17. A system for providing routing protocol redundancy in a router comprising:
an active processor;
a standby processor;
a forwarding unit configured to forward protocol information from said active processor to said standby processor for synchronizing link configuration and link protocol states of said active processor at said standby processor, wherein the protocol information comprises global protocol information, interface information, adjacencies information, link state packet information, and status information; and
a switching unit configured to switch said router to said standby processor when a failure is detected at said active processor;
wherein all states of said link protocol immediately function as if the failure had not occurred.

18. The system of claim 17 wherein said link protocol is an Intermediate System to Intermediate System (IS-IS) protocol.

19. The system of claim 17 wherein said protocol information is one or more of IS-IS global protocol information, IS-IS interface information, link state packet (LSP) information, IS-IS configuration information and IS-IS adjacencies information.

20. The system of claim 19 wherein said IS-IS configuration information is received from Command Line Interface (CLI) commands.

21. The system of claim 17 further comprising:
an updating unit configured to update protocol information at said active processor; and
a forwarding unit configured to forward said updated network link protocol information to said standby processor.

22. The system of claim 17 further comprising a Shortest Path First (SPF) computing unit configured to compute a shortest route between said routes and all destinations.

23. The system of claim 22 further comprising a router table manager for storing the computed shortest routes.

24. The system of claim 17 wherein said active processor is an active IS-IS control card.

25. The system of claim 17 wherein said standby processor is a standby IS-IS control card.

26. A system for providing routing protocol redundancy in a router comprising:
an active processor;
a standby processor;
a forwarding unit configured to forward protocol information from said active processor to said standby processor for synchronizing link configuration and link protocol states of said active processor at said standby processor;
a switching unit configured to switch said router to said standby processor when a failure is detected at said active processor;
a Shortest Path First (SPF) computing unit configured to compute a shortest route between said routes and all destinations;
a router table manager configured to store the computed shortest routes; and
a route distribution manager configured to distribute the computed shortest routes stored in said route table manager to one or more other protocols,
wherein all states of said link protocol immediately function as if the failure had not occurred.

27. A system for providing Intermediate System to Intermediate System (IS-IS) protocol redundancy in a router comprising:
- an active processor;
- a standby processor;
- a forwarding unit configured to forward protocol information from said active processor to said standby processor for synchronizing link configuration and Intermediate System to Intermediate System (IS-IS) protocol states of said active processor at said standby processor, wherein the protocol information comprises global protocol information, interface information, adjacencies information, link state packet information, and status information; and
- a switching unit configured to switch said router to said standby processor when a failure is detected at said active processor;
- wherein all said protocol states immediately function as if the failure had not occurred.

28. A system for providing Intermediate System to Intermediate System (IS-IS) protocol redundancy in a router comprising:
- an active processor;
- a standby processor;
- a forwarding unit configured to forward IS-IS protocol information from said active processor to said standby processor for synchronizing link configuration and IS-IS protocol states of said active processor at said standby processor, said IS-IS protocol information comprising IS-IS global protocol information, IS-IS interface information, link state packet (LSP) information, IS-IS configuration information and IS-IS adjacencies information; and
- a switching unit configured to switch said router to said standby processor when a failure is detected at said active processor;
- wherein all states of said IS-IS protocol immediately function as if the failure had not occurred.

29. A system for providing routing protocol redundancy in a router comprising:
- active processor means for processing routing information;
- standby processor means for processing routing information;
- means for forwarding protocol information from said active processor to said standby processor for synchronizing link configuration and link protocol states of said active processor at said standby processor, wherein the protocol information comprises global protocol information, interface information, adjacencies information, link state packet information, and status information; and
- means for switching said router to said standby processor when a failure is detected at said active processor;
- wherein all states of said link protocol immediately function as if the failure had not occurred.

* * * * *